(12) United States Patent
Bjontegaard et al.

(10) Patent No.: US 9,386,304 B2
(45) Date of Patent: Jul. 5, 2016

(54) DIGITAL VIDEO COMPRESSION SYSTEM, METHOD AND COMPUTER READABLE MEDIUM

(71) Applicant: CISCO TECHNOLOGY, INC., San Jose, CA (US)

(72) Inventors: Gisle Bjontegaard, Lysaker (NO); Arild Fuldseth, Lysaker (NO)

(73) Assignee: Cisco Technology, Inc., San Jose, CA (US)

( * ) Notice: Subject to any disclaimer, the term of this patent is extended or adjusted under 35 U.S.C. 154(b) by 661 days.

(21) Appl. No.: 13/745,378

(22) Filed: Jan. 18, 2013

(65) Prior Publication Data

US 2013/0188687 A1    Jul. 25, 2013

Related U.S. Application Data

(60) Provisional application No. 61/588,403, filed on Jan. 19, 2012, provisional application No. 61/604,299, filed on Feb. 28, 2012.

(51) Int. Cl.
*H04N 19/82* (2014.01)
*H04N 19/10* (2014.01)

(52) U.S. Cl.
CPC ......... *H04N 19/00006* (2013.01); *H04N 19/82* (2014.11)

(58) Field of Classification Search
CPC .... H04N 19/186; H04N 19/176; H04N 19/65
See application file for complete search history.

(56) References Cited

U.S. PATENT DOCUMENTS

| | | | |
|---|---|---|---|
| 2009/0087111 A1 | 4/2009 | Noda et al. | |
| 2010/0220235 A1 | 9/2010 | Jia et al. | |
| 2011/0305274 A1 | 12/2011 | Fu et al. | |
| 2012/0177103 A1* | 7/2012 | Fu et al. | 375/240.02 |
| 2012/0177107 A1* | 7/2012 | Fu et al. | 375/240.03 |
| 2012/0207227 A1* | 8/2012 | Tsai et al. | 375/240.29 |
| 2012/0294353 A1* | 11/2012 | Fu et al. | 375/240.02 |
| 2013/0114677 A1* | 5/2013 | Baylon et al. | 375/240.02 |
| 2013/0114683 A1* | 5/2013 | Zhao et al. | 375/240.03 |
| 2013/0177067 A1* | 7/2013 | Minoo et al. | 375/240.02 |
| 2013/0177068 A1* | 7/2013 | Minoo et al. | 375/240.02 |
| 2013/0308696 A1* | 11/2013 | Kim et al. | 375/240.02 |
| 2015/0124866 A1* | 5/2015 | Fu et al. | 375/240.02 |
| 2015/0124869 A1* | 5/2015 | Fu et al. | 375/240.02 |
| 2015/0163488 A1* | 6/2015 | Tsai et al. | 375/240.02 |
| 2015/0172657 A1* | 6/2015 | Chong et al. | 375/240.02 |
| 2015/0189296 A1* | 7/2015 | Alshina et al. | 375/240.02 |

OTHER PUBLICATIONS

International Search Report and Written Opinion cited in PCT/US2013/22132, mailed Apr. 8, 2013.

* cited by examiner

*Primary Examiner* — Jay Patel
*Assistant Examiner* — Neil Mikeska

(57) ABSTRACT

A video decoding method including: receiving an encoded block of data; decoding the encoded block of data to generate decoded data; and performing a sample adaptive offset on a whole or part of the decoded data, wherein a pixel B to be modified as part of the sample adaptive offset is adjacent to pixels A and C, and the pixel B is modified as part of the sample adaptive offset if (B≤A and B≤C) or (B≥A and B≥C).

22 Claims, 4 Drawing Sheets

US 9,386,304 B2

DIGITAL VIDEO COMPRESSION SYSTEM, METHOD AND COMPUTER READABLE MEDIUM

CROSS-REFERENCE TO RELATED APPLICATIONS

The present application contains subject matter related to U.S. Utility application Ser. No. 12/268,842, filed on Nov. 11, 2008, Ser. No. 12/987,246, filed on Jan. 10, 2011, Ser. No. 13/290,665, filed on Nov. 7, 2011, Ser. No. 13/538,171, filed on Jun. 29, 2012, and U.S. Provisional application Ser. No. 61/502,966, filed Jun. 20, 2011, 61/533,582, filed on Sep. 12, 2011, 61/556,594, filed on Nov. 7, 2011, 61/588,403, filed Jan. 19, 2012, and 61/604,299, filed Feb. 28, 2012, the entire contents of each of these utility applications and provisional applications is incorporated herein by reference in their entirety. The present application claims the benefit of provisional application Nos. 61/588,403 and 61/604,299.

BACKGROUND

1. Technological Field

This technology generally relates to video decompression and compression systems, methods and computer program product.

2. Description of the Related Art

The "background" description provided herein is for the purpose of generally presenting the context of the disclosure. Insight provided by the present inventor, to the extent it is described in this background section, as well as aspects of the description which may not otherwise qualify as prior art at the time of filing, are neither expressly or impliedly admitted as prior art.

Transmission of moving pictures in real-time is employed in numerous applications such as video conferencing, "net meetings", television (TV) broadcasting and video telephony.

However, representing moving pictures involves bulk information, in digital form, and is described by representing each picture element (pixel) in a picture (or image frame) with 8 bits (1 Byte). Aggregation of uncompressed video data results in very large bit quantities, and as a consequence demands large bandwidth allocation for transmission over conventional communication networks in real time due to limited bandwidth.

Due to significant redundancy in images between successive frames, data compression is freely applied in real time video transmission applications. Data compression may, however, compromise picture quality and so persistent efforts continue to be made to develop data compression techniques allowing real time transmission of high quality video over bandwidth limited resources.

In video compression systems, an objective is to represent the video information with as little "capacity" as possible, where capacity is usually measured in bits, either as a constant value or as bits/time unit. By minimizing bits, the amount of bits that need to be transmitted is reduced, and therefore, the amount of communication resources needed to support the real time transmission of video data is also reduced.

DETAILED DESCRIPTION

Overview

Figure 1:
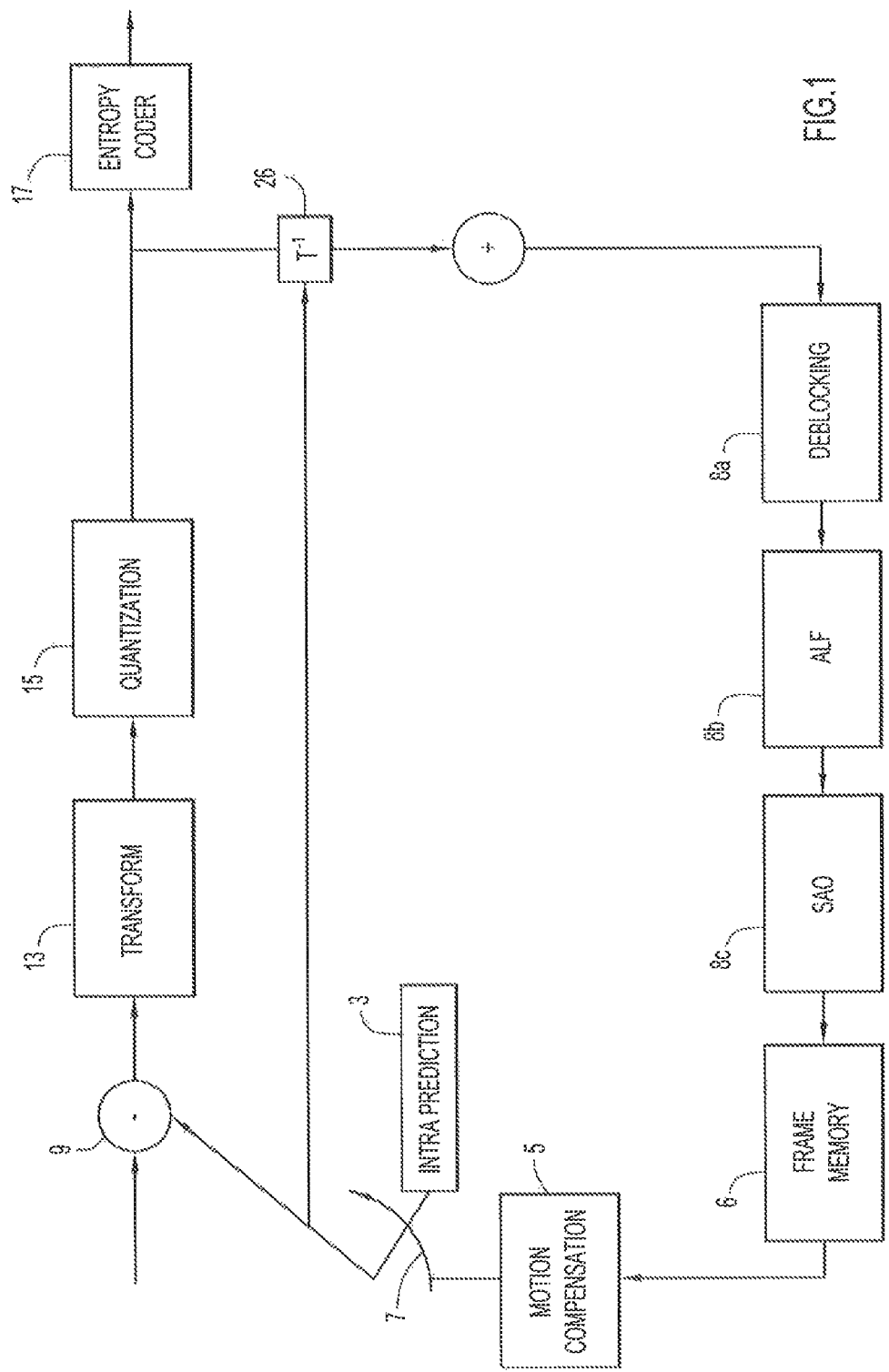
FIG. 1 is an exemplary block diagram of a video encoder.

A video decoding method including: receiving an encoded block of data; decoding the encoded block of data to generate decoded data; and performing a sample adaptive offset on a whole or part of the decoded data, wherein a pixel B to be modified as part of the sample adaptive offset is adjacent to pixels A and C, and the pixel B is modified as part of the sample adaptive offset if ($B \leq A$ and $B \leq C$) or ($B \geq A$ and $B \geq C$).

Exemplary Embodiments

The non-limiting embodiments described herein may relate to tools useable in HEVC (high efficiency video coding). One such tool may be referred to as Sample Adaptive Offset (SAO).

The most common video coding methods are described in the MPEG* (e.g., MPEG 2 and MPEG 3) and H.26* (e.g., H.263 and H.264) standards. According to these standards, the video data is exposed to four main processes before transmission, namely prediction, transformation, quantization and entropy coding. At present there is work going on towards a new High Efficiency Video Coding (HEVC) standard. This work is a joint effort between ISO and ITU.

The prediction process performed in a prediction processor significantly reduces the number of bits required for each frame in a video sequence to be transferred. It takes advantage of the similarity of parts of the sequence with other parts of the sequence. A decoder that decodes the bit stream has side information to assist in the decoding process. This side information is known to both encoder and decoder and so only the difference has to be transferred. This difference typically requires much less capacity for its representation than the full image. The motion estimation aspect of the prediction is mainly based on picture content from previously reconstructed pictures where the location of the content is defined by motion vectors. The prediction process is typically performed on square block sizes (e.g. 16×16 pixels), although the size of the blocks may vary.

Note that in some cases, predictions of pixels based on the adjacent pixels in the same picture rather than pixels of preceding pictures are used. This is referred to as intra prediction, as opposed to inter prediction.

The residual represented as a block of data (e.g. 4×4 or 8×8 pixels) may still contain internal correlation. A conventional method of taking advantage of this is to perform a two dimensional block transform. The ITU recommendation H.264 uses a 4×4 or 8×8 integer type transform. This transforms n×n pixels into n×n transform coefficients and they can usually be represented by fewer bits than the raw pixel representation. Transformation of an n×n array of pixels with internal correlation will often result in an n×n block of transform coefficients with much fewer non-zero values than the original n×n pixel block.

Direct representation of the transform coefficients is still too costly for many applications. A quantization process is carried out for a further reduction of the data representation. Hence the transform coefficients output from the transform undergo quantization. The possible value range of the transform coefficients is divided into value intervals (or gradations), each limited by an uppermost and lowermost decision value and assigned a fixed quantization value. The transform coefficients are then quantified to the quantization value associated with the intervals within which the respective coefficients reside. Coefficients being lower than the lowest decision value are quantified to zeros. It should be mentioned that this quantization process results in the reconstructed video sequence being somewhat different compared to the uncompressed sequence.

Summarized, a digital video picture is exposed to the following steps:

Divide the picture into blocks of pixels, for instance in the range from 4×4 to 64×64 pixels. This is done for luminance information as well as for chrominance information.

Produce a prediction for the pixels in the block. This may be based on pixels in an already coded/decoded picture (called inter prediction) or on already coded/decoded pixels in the same picture (intra prediction).

Form a difference between the pixels to be coded and the predicted pixels. This is often referred to as a residual.

Perform a two dimensional transformation of the residual resulting in a representation as transform coefficients.

Perform a quantization of the transform coefficients. This is the major tool for controlling the bit production and reconstructed picture quality.

Establish a scanning of the two dimensional transform coefficient data into a one dimensional set of data.

Perform lossless entropy coding of the quantized transform coefficients.

The above steps are listed in a natural order for the encoder. The decoder will to some extent perform the operations in the opposite order and do "inverse" operations as inverse transform instead of transform and de-quantization instead of quantization.

In an exemplary coding process, an in-loop filter is characterized as a filter being performed on pixels somewhere after the motion compensation, but before the same pixels are used for prediction of subsequent pixels to be coded. In H.261 a filtering operation could be performed after the motion compensation, but before the inter prediction is made. In H.261 integer pixel motion compensation was used. The in-loop filter was used mainly to reduce high frequency noise from the prediction. In for example H.262, H.263 and H.264 an in-loop deblocking filter is used. This filter is performed after the first reconstruction of pixels, but before the same pixels are used for prediction of subsequent pixels to be coded. A deblocking filter operates specifically on pixels close to coding block edges to reduce undesired "blocking artifacts".

HEVC may include 3 in-loop filters, which are a deblocking filter, an Adaptive Loop Filter (ALF), and Sample Adaptive Offset (SAO) filter. However, not all of these filters are required, and additional filters may be added. No particular order for the execution of these filters is required.

FIG. 1 is a block diagram of a video encoder. A current frame and a prediction frame are input to a subtractor 9. The subtractor 9 is provided with input from an intra prediction processing path 3 and a motion compensation processing path 5, the selection of which is controlled by switch 7. Intra prediction processing is selected for finding similarities within the current image frame, and is thus referred to as "intra" prediction. Motion compensation has a temporal component and thus involves analysis between successive frames that is referred to as "inter" prediction.

The output of the switch 7 is subtracted from the pixels of the current frame in a subtractor 9, prior to being subjected to a two dimensional transform process 13. The transformed coefficients are then subjected to quantization in a quantizer 15 and then subject to an entropy encoder 17. Entropy encoding removes redundancies without losing information, and is referred to as a lossless encoding process. Subsequently, the encoded data is arranged in network packets via a packetizer, prior to be transmitted in a bit stream.

However, the output of the quantizer 15 is also applied to an inverse transform and used for assisting in prediction processing. The output is applied to a deblocking filter 8a, which suppresses some of the sharpness in the edges to improve clarity and better support prediction processing. The output of the deblocking filer 8a is optionally subjected to ALF 8b and SAO 8c, both of which are described below. The output of deblocking filter 8a or SAO 8C is applied to a frame memory 6, which holds the processed image pixel data in memory for use in subsequent motion processing.

Figure 2:
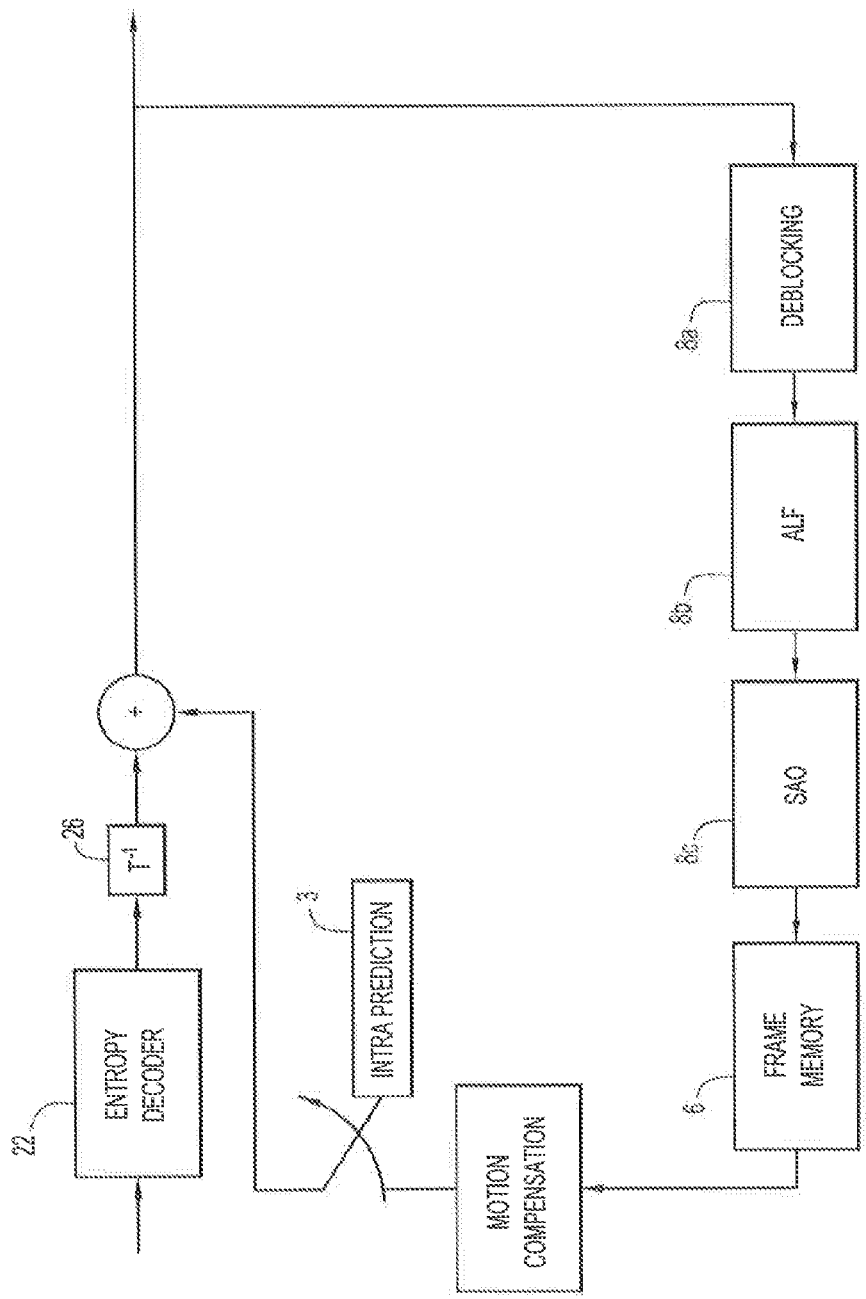
FIG. 2 is an exemplary block diagram of video decoder.

The corresponding decoding process for each block can be described as follows (as indicated by the video decoder of FIG. 2). After entropy decoding 22 (to produce the quantized transform coefficients) and two dimensional inverse transformation 26 on the quantized transform coefficient to provide a quantized version of the difference samples, the resultant image is reconstructed after adding the inter prediction and intra prediction data previously discussed with respect to FIG. 1.

ALF is performed on a whole or part (region or block) of a frame. It may be performed after the deblocking filter. A Wiener filtering approach may be used on the encoder side to calculate filter coefficients to minimize the Mean Square Error (MSE) between the original pixels and the reconstructed pixels. The obtained filter coefficients are quantized and signaled to the decoder. The encoder and decoder perform the same one or two dimensional filtering operation on each pixel. The result is that the picture quality is improved (lower MSE) at a cost in bitrate for filter coefficient signaling. The overall effect is typically a better picture quality (measured by MSE) with a same bitrate as without ALF.

SAO is performed on a whole or part (region or block) of a frame after the deblocking filter and after the optional ALF. SAO may have two parts: Band Offset (BO) and Edge Offset (EO). For one region either BO or EO is used.

Band Offset (BO)

Depending on the bit depth, each pixel has a dynamic range. As an example, with 8 bit pixels the dynamic range is from 0 to 255. This dynamic range is divided into 32 bands with 8 pixel values in each band. Next, the 32 bands are divided into two groups and only the offsets in one of the two groups are chosen to be transmitted. One group consists of the central 16 bands while the other group consists of the remaining bands. The offset values of the 16 bands may be signaled to the decoder so that encoder and decoder can perform the same correction to each pixel in the 16 bands. Again, the overall effect is typically a better picture quality (measured by MSE) with the same bitrate as without BO.

Edge Offset (EO)

Figure 3:
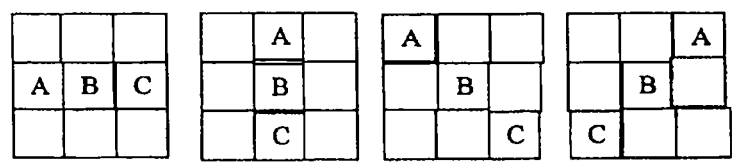
FIG. 3 illustrates exemplary edge offset patterns.

EO classifies all pixels of a region into multiple categories by comparing each pixel with its neighboring pixels. The EO patterns are shown in FIG. 3. B is the pixel to be modified. A and C are the neighboring pixels. When EO is used, one of the four 1-D patterns can be chosen for pixel classification. The classification rules of 1-D patterns are shown in table 1.

TABLE 1

| Category | Condition |
| --- | --- |
| 1 | B < A and B < C |
| 2 | B < one neighbor and equal to the other |

TABLE 1-continued

| Category | Condition |
| --- | --- |
| 3 | B > one neighbor and equal to the other |
| 4 | B > A and B > C |
| 0 | None of the above |

If SAO is to be used in a region, the following information may be signaled:

If BO, EO or none of them shall be used.

In case of BO: Identify the 16 bands to be modified (see above). Signal offsets for the 16 bands. Perform BO corrections to all 16 bands in a region.

In the case of EO: one out of four classification patterns and an offset for each of categories 1 to 4. Then all pixels in a region are modified with the appropriate offset for categories 1 to 4. Pixels belonging to category 0 are not modified.

Other exemplary embodiments described below may result in a simplification of the EO and BO described above. However, the following embodiments still provide a similar coding benefit as the EO and BO discussed above.

The SAO operations may be performed on smaller blocks of pixels. In HEVC there is a concept of Coding Unit (CU) where major coding operations like prediction and residual coding take place. The size of a CU may be in the range from 8×8 to 64×64 pixels. LCU is used to define the Largest Coding Unit. In the discussion that follows, the concept of "Block of pixels" will be used, and the size of such a block may typically be in the same range as a CU or LCU.

Other Embodiments for Edge Offset (EO)

The exemplary embodiment described above involved four categories. However, the number of categories is reduced from 4 to 2 in this alternative embodiment. Categories 1 and 2 are combined into one category: (B≤A and B≤C). Categories 3 and 4 are combined into one category: (B≥A and B≥C)

Modifications to a pixel B in the combined categories 1 and 2 may only be ≥0 and modifications to a pixel in the combined categories 3 and 4 may only be ≤0. This means that the filter is limited to have a low pass effect. Modifications equal to zero for each category may have to be signaled to an apparatus receiving the encoded data.

In another embodiment, modifications to a pixel B in the combined categories 1 and 2 may only takes values of 0 or 1 and modifications to a pixel B in the combined categories 3 and 4 may only take values of 0 or −1. One out of the two values for modifications to each category may have to be signaled to an apparatus receiving the encoded data, the other being a type of default value.

In another embodiment, if |A+C−2B|<2, then no modification is made to pixel B. As an example, consider (A,B,C)=(10,10,11). A modification to (A,B',C)=(10,11,11) does not represent a smoothing. On the other hand, if (A,B,C)=(10,10,12), (A,B',C)=(10,11,12) does represent a smoothing.

In another embodiment, modifications to a pixel B in the combined categories 1 and 2 may only take a value of 1 and modifications to a pixel B in the combined categories 3 and 4 may only take a value of −1. In this case no offset needs to be signaled to the apparatus receiving the encoded data. However, whether to use EO on a block of pixels may be signaled.

In another embodiment, modifications to a pixel B in the combined categories 1 and 2 may only take a value of 1 and modifications to a pixel B in the combined categories 3 and 4 may only take a value of −1, but if |A+C−2B|<2 then no modification is made to pixel B.

In another embodiment, it is assumed that the neighboring pixels to are A, B, and C, wherein B is the pixel to be modified and B' is the modified value. Accordingly,

```
if(|A+C−B−B| > 1) then
    if(A ≥ B & C ≥ B) then
        B' = B + 1
    else if(A ≤ B & C ≤ B) then
        B' = B − 1
    else
        B' = B
    end if
End if.
```

In another embodiment, the encoder can choose between a simple mode and a more advanced mode. Whether to use the simple or advanced mode is signaled by using one binary flag having the value 0 or 1. Typically, in the simple mode, a small number (or zero) parameters (edge and band offset values) with a small range are signaled from the encoder to the decoder. The simple mode can be any of the embodiments described above under Other Embodiments for Edge Offset (EO) or any combination of these, but is not limited to any of these. Which combination of simple embodiments to use is known to the decoder as a-priori information. In the advanced mode, a much larger number of parameters (edge or band offset values) with a larger range are signaled from the encoder to the decoder. The advanced mode can be any of the embodiments described above under Band Offset (BO) and under Edge Offset (EO) or any combination of these, but not limited to any of these. Which combination of advanced embodiments to use is known to the decoder as a-priori information.

In another embodiment, it is foreseen that the information for the offsets for the 4 categories is reduced from one value for each category to something less, but still signaling offset information. One such type of reduced information is to signal a positive value offset1 so that pixel B is corrected with +offset1 if it belongs to category 1 and pixel B is corrected with −offset1 if it belongs to category 4 and to signal a positive value offset2 so that pixel B is corrected with +offset2 if it belongs to category 2 and pixel B is corrected with −offset2 if it belongs to category 3. Another type of reduced information is to signal a positive value offset1 so that pixel B is corrected with +offset1 if it belongs to category 1 and pixel B is corrected with a value derived from offset1 which can be, but not restricted to offset1/2 if it belongs to category 2 and to signal a value offset2 so that pixel B is corrected with −offset2 if it belongs to category 4 and pixel B is corrected with a value derived from offset2 which can be, but not restricted to −offset2/2 if it belongs to category 3. A third type of reduced information is to signal one positive value offset and to correct B with +offset if it belongs to category 1 and to correct B with −offset if it belongs to category 4 and to correct B with a value derived from offset which can be, but not restricted to offset/2 if it belongs to category 2 and to correct B with a value derived from offset which can be, but not restricted to −offset/2 if it belongs to category 3.

In another embodiment, assuming that the offset under consideration is Offset, where |Offset| is >0. A test including the parameters A, B, C and Offset is performed and a modification is made to pixel B only if the test is true. An example of the test can be: If |A+C−B−B|≥2*|Offset|, but the application is not restricted to this specific test.

The two chroma components may undergo a similar EO filter operation as the luma on a CU/LCU level. Chroma EO may be coupled with luma EO so that chroma EU may be performed only if luma EU is performed. Chroma EO on/off is signaled in case luma EO is on. Alternatively, separate parameters for chroma EU can be signaled.

Other Embodiments for Band Offset (BO)

As described above, the dynamic range is divided into bands. The encoding apparatus may define the bands or bandwidth, and it may be done for each block. The encoding apparatus may test all possible bandwidths and use (and signal to the decoder) the one with the best performance. The encoding apparatus may perform a test by reconstructing a block of pixels in all possible ways and using the one that produces the lowest mean square error (MSE). Another option is to use Rate Distortion Optimization (RDO). With this approach, the following expression is calculated: RD=MSE+λ*bits. λ is a constant and bits is the number of bits to signal a special filter. The filter with the lowest RD is selected. No filtering is also a possibility. For no filtering, "bits" is 0 so that RD for "no filtering" is just MSE without filtering.

An offset is assigned to each band by the encoding apparatus. For instance, four such assignments can be used as in the following example, but other constellations may be used. The encoding apparatus, in addition to testing different bandwidths, may also test different assignments of offsets and determine which combination is best. The selected assignment will be communicated to the decoder apparatus by the encoder apparatus.

While the encoding apparatus may select the bandwidth and assignments through testing, the encoding apparatus may select from among predetermined options, which are also known to the decoding apparatus. The encoding apparatus may then merely communicate which of the predetermined options are being used to the decoding apparatus, which results in less bits being communicated between the encoding apparatus and decoding apparatus.

The following is an example of offset values for different bands and assignments:

| Assignment: | 1 | 2 | 3 | 4 |
|---|---|---|---|---|
| (0-31) | 0 | 1 | 0 | −1 |
| (32-63) | 1 | 0 | −1 | 0 |
| (64-95) | 0 | 1 | 0 | −1 |
| (96-127) | 1 | 0 | −1 | 0 |
| (128-159) | 0 | 1 | 0 | −1 |
| (160-191) | 1 | 0 | −1 | 0 |
| (192-223) | 0 | 1 | 0 | −1 |
| (224-255) | 1 | 0 | −1 | 0 |

This is an example with each band consisting of $2^N$ values, with N=5 (resulting in $2^5$=32 values). This can be referred to as a band width of 32. Other bandwidths may be used. For computational reasons it is preferable to use bandwidths of size $2^N$. More general bands can also be used. In that case a band need not consist of $2^N$ values and the number of values in each band may be different. For example:
(0-25)
(26-39)
(40-60)
(61-85)
(86-120)
(121-151)
(152-181)
(182-211)
(212-235)
(236-255)

As part of the above-noted testing, the encoding apparatus may select between both different assignments and different bandwidths. For example, four assignments and two bandwidths. The last could be N=4 and 5. The possible assignments and bandwidths are known to the decoder so that the encoder then has to signal to the decoder both the bandwidths and the assignment number. This example is indicated in the table below:

TABLE 2

| Assignment: | 1 | 2 | 3 | 4 |
|---|---|---|---|---|
| Bandwidth N = 4 | | | | |
| (0-15) | 0 | 1 | 0 | −1 |
| (16-31) | 1 | 0 | −1 | 0 |
| (32-47) | 0 | 1 | 0 | −1 |
| (48-63) | 1 | 0 | −1 | 0 |
| (64-79) | 0 | 1 | 0 | −1 |
| (80-95) | 1 | 0 | −1 | 0 |
| (96-111) | 0 | 1 | 0 | −1 |
| (112-127) | 1 | 0 | −1 | 0 |
| (128-143) | 0 | 1 | 0 | −1 |
| (144-159) | 1 | 0 | −1 | 0 |
| (160-175) | 0 | 1 | 0 | −1 |
| (176-191) | 1 | 0 | −1 | 0 |
| (192-207) | 0 | 1 | 0 | −1 |
| (208-223) | 1 | 0 | −1 | 0 |
| (224-239) | 0 | 1 | 0 | −1 |
| (240-255) | 1 | 0 | −1 | 0 |
| Bandwidth N = 5 | | | | |
| (0-31) | 0 | 1 | 0 | −1 |
| (32-63) | 1 | 0 | −1 | 0 |
| (64-95) | 0 | 1 | 0 | −1 |
| (96-127) | 1 | 0 | −1 | 0 |
| (128-159) | 0 | 1 | 0 | −1 |
| (160-191) | 1 | 0 | −1 | 0 |
| (192-223) | 0 | 1 | 0 | −1 |
| (224-255) | 1 | 0 | −1 | 0 |

The data in Table 2 may be stored in memory devices accessible by the video encoder and/or the video decoder. Thus, the video encoder does not have to transmit the offsets to the video decoder. Rather, the video encoder may transmit the bandwidth and assignment, and the video decoder can look-up the appropriate offset in the stored table.

For an implementation example, N defines the bandwidth (see above), X is the pixel to be corrected, and BN is bit number N of X.

Example: X=11001101. Then:
B0=1
B1=0
B2=1
B3=1
B4=0
B5=0
B6=1
B7=1

The corrected pixel X for the 4 different assignments above is as follows:

| Assignment | Corrected pixel |
|---|---|
| 1 | X' = X + BN |
| 2 | X' = X + (1 − BN) |
| 3 | X' = X − BN |
| 4 | X' = X − (1 − BN) |

Based on Table 2, if we look at B4 (bit number 4) of all the numbers between 0 and 255, B4 is 0 for numbers (0-15), (32-47, (64-79), etc., and B4 is 1 for the numbers (16-31), (48-63), (80-95), etc., for assignment 1.

In the above example, the two chroma components may be treated together. However, the two chroma components may be treated separately. The chroma SAO may be linked with the luma SAO, or the chroma SAO may be signaled and performed independently from luma SAO.

As discussed above, multiple bandwidths (N) may be tested by the encoding apparatus to determine the best performance. In another embodiment, two values for N may be tested. For luma, N=4 and 5 may be tested. For chroma, N=3 and 4 may be tested. This results in 8 "assignments" (4×2) requiring 3 bits.

A syntax describes the bits being sent in the bitstream from the encoder to the decoder. The syntax for parameters to be used may be contained in a block of pixels. Hence, the SAO operations can be structurally aligned with other coding/decoding operations. Parameters that may be signaled for a block of pixels:

Whether to use SAO or not;
If SAO is being used, whether to use EO or BO, or for both luma and chroma;
One out of the predefined classification patterns used for EO (see exemplary four options in FIG. 3);
Possibly some information of offset values given the relevant restrictions related to EO listed above;
If BO is signaled, both offset assignments and bandwidth need to be signaled (this may be done separately for all luma and chroma components or for some or all of the luma and chroma components in combination); and
If it is signaled to use SAO, it may be signaled that all or parts of the information needed to specify SAO parameters is identical to the corresponding information used in a previously coded block of pixels. Information to specify the location of the block of pixels may also be available.

An example of bit syntax for an exemplary embodiment follows.

SAO on/off 1 bit
If on: chroma on/off and luma EO/BO need to be signaled. These parameters are coded and combined with a VLC (variable length coding) in the following way:

| VLC | Chroma | luma EO/BO |
|-----|--------|------------|
| 1 | on | EO |
| 01 | off | EO |
| 001 | on | BO |
| 0001 | off | BO (Could also use code 000 for a slight savings in bits). |

Figure 4:
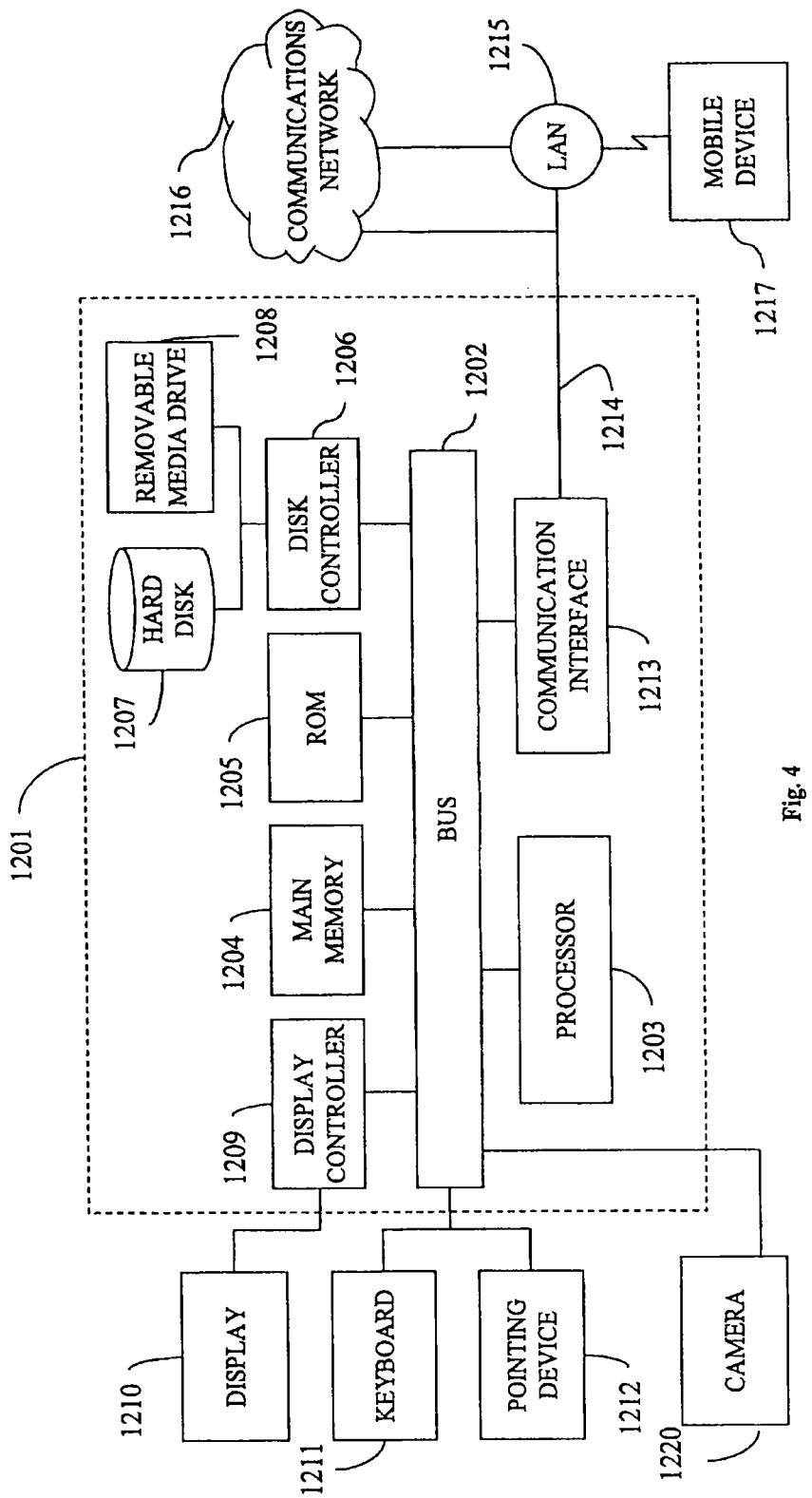
FIG. 4 illustrates an exemplary hardware computer system that is programmed as a video encoder and/or a video decoder.

If luma EO: 2 bits for 4 classifications
If luma BO: 3 bits for 8 assignments—4 assignments and 2 bandwidths.
If chroma on and luma EO: No extra chroma bits. Do chroma EO with luma classification
If chroma on and luma BO: 3 bits for 8 assignments. Do chroma BO
Hardware FIG. 4 illustrates a computer system 1201 upon which the above-described embodiments may be implemented. The computer system in FIG. 4 may be programmed as an encoder apparatus or a decoder apparatus and execute the algorithms described above. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the described above in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 120

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Although aspects are discussed with respect to particular embodiments, it is to be understood that these embodiments are merely illustrative of the principles and applications of the present technological advancement. It is therefore to be understood that numerous modifications may be made to the illustrative embodiments and that other arrangements may be devised without departing from the spirit and scope of the present invention as defined by the appended claims.

The invention claimed is:

1. A video decoding method comprising:
receiving, at a decoding apparatus, an encoded block of data representing video frames transmitted from an encoding apparatus;
receiving, at the decoding apparatus from the encoding apparatus, a flag indicating that the encoded block of data has been encoded with a sample adaptive offset;
receiving, at the decoding apparatus from the encoding apparatus, one or more classification and offset parameters for the encoded block of data;
decoding, at the decoding apparatus, the encoded block of data to generate decoded data; and
performing, at the decoding apparatus, the sample adaptive offset on a whole or part of the decoded data according to the one or more classification and offset parameters,
wherein a pixel B to be modified as part of the sample adaptive offset is adjacent to pixels A and C, the pixel B is classified into one of five categories 1) $B<A$ and $B<C$; 2) B<one neighbor and equal to the other; 3) B>one neighbor and equal to the other; 4) $B>A$ and $B>C$; and 5) none of the above, and the categories 1) and 2) are combined in a first combined category for ($B \leq A$ and $B \leq C$) and the categories 3) and 4) are combined in a second combined category for ($B \geq A$ and $B \geq C$), and the pixel B is modified as part of the sample adaptive offset if (B≤A and B≤C) or (B≥A and B≥C).

2. The video decoding method of claim 1, wherein if (B≤A and B≤C), then the modification to pixel B as part of the sample adaptive offset is ≥0, and if (B≥A and B≥C), then the modification to pixel B as part of the sample adaptive offset is ≤0.

3. The video decoding method of claim 1, wherein if (B≤A and B≤C), then the modification to pixel B as part of the sample adaptive offset is 0 or 1, and if (B≥A and B≥C), then the modification to pixel B as part of the sample adaptive offset is 0 or −1.

4. The video decoding method of claim 1, wherein if |A+C−2B|<2, then no modification is made to the pixel B as part of the sample adaptive offset.

5. The video decoding method of claim 1, wherein if (B≤A and B≤C), then the modification to pixel B as part of the sample adaptive offset is only 1, and if (B≥A and B≥C), then the modification to pixel B as part of the sample adaptive offset is only −1.

6. The video decoding method of claim 5, wherein if |A+C−2B|<2, then no modification is made to the pixel B as part of the sample adaptive offset.

7. The video decoding method of claim 1,
wherein the one or more classification and offset parameters include a signal indicating a value of modification applied to the pixel B.

8. The video decoding method of claim 1,
wherein the flag is a binary flag that indicates whether a simple mode sample adaptive offset is to be applied or if an advanced mode sample adaptive offset is to be applied.

9. The video decoding method of claim 1,
wherein the one or more classification and offset parameters include a signal that the pixel B is modified by a positive offset if pixel B belongs to a first category and or a negative offset if pixel B belongs to a second category.

10. The video decoding method of claim 1, wherein an offset under consideration is Offset, wherein |Offset|>0, and pixel B is modified only if |A+C−B−B|≥2*|Offset|.

11. A non-transitory computer readable storage medium encoded with instructions, which when executed by a decoding apparatus causes the decoding apparatus to implement a video decoding method comprising:
receiving, at the decoding apparatus, an encoded block of data representing video frames transmitted from an encoding apparatus;
receiving, at the decoding apparatus from the encoding apparatus, a flag indicating that the encoded block of data has been encoded with a sample adaptive offset;
receiving, at the decoding apparatus from the encoding apparatus, one or more classification and offset parameters for the encoded block of data;
decoding, at the decoding apparatus, the encoded block of data to generate decoded data; and
performing, at the decoding apparatus, the sample adaptive offset on a whole or part of the decoded data according to the one or more classification and offset parameters,
wherein a pixel B to be modified as part of the sample adaptive offset is adjacent to pixels A and C, the pixel B is classified into one of five categories 1) B<A and B<C; 2) B<one neighbor and equal to the other; 3) B>one neighbor and equal to the other; 4) B>A and B>C; and 5) none of the above, and the categories 1) and 2) are combined in a first combined category for (B≤A and B≤C) and the categories 3) and 4) are combined in a second combined category for (B≥A and B≥C), and the pixel B is modified according to the first combined category or the second combined category.

12. The non-transitory computer readable storage medium of claim 11, wherein if (B≤A and B≤C), then the modification to pixel B as part of the sample adaptive offset is ≥0, and if (B≥A and B≥C), then the modification to pixel B as part of the sample adaptive offset is ≤0.

13. The non-transitory computer readable storage medium of claim 11, wherein if (B≤A and B≤C), then the modification to pixel B as part of the sample adaptive offset is 0 or 1, and if (B≥A and B≥C), then the modification to pixel B as part of the sample adaptive offset is 0 or −1.

14. The non-transitory computer readable storage medium of claim 11, wherein if |A+C−2B|<2, then no modification is made to the pixel B as part of the sample adaptive offset.

15. The non-transitory computer readable storage medium of claim 11, wherein if (B≤A and B≤C), then the modification to pixel B as part of the sample adaptive offset is only 1, and if (B≥A and B≥C), then the modification to pixel B as part of the sample adaptive offset is only −1.

16. The non-transitory computer readable storage medium of claim 15, wherein if |A+C−2B|<2, then no modification is made to the pixel B as part of the sample adaptive offset.

17. The non-transitory computer readable storage medium of claim 11, wherein
the one or more classification and offset parameters include a signal indicating a value of modification applied to the pixel B.

18. The non-transitory computer readable storage medium of claim 11, wherein
the flag is a binary flag that indicates whether a simple mode sample adaptive offset is to be applied or if an advanced mode sample adaptive offset is to be applied.

19. The non-transitory computer readable storage medium of claim 11, wherein
the one or more classification and offset parameters include a signal that the pixel B is modified by a positive offset if pixel B belongs to a first category and or a negative offset if pixel B belongs to a second category.

20. A decoding apparatus, comprising:
a memory that stores computer executable instructions;
a communication terminal that receives from an encoding apparatus an encoded block of data representing video frames, a flag indicating that the encoded block of data has been encoded with a sample adaptive offset, and one or more classification and offset parameters for the encoded block of data; and
a processor that executes the instructions in order to
decode the encoded block of data to generate decoded data, and
perform the sample adaptive offset on a whole or part of the decoded data according to the one or more classification and offset parameters,
wherein a pixel B to be modified as part of the sample adaptive offset is adjacent to pixels A and C, the pixel B is classified into one of five categories 1) B<A and B<C; 2) B<one neighbor and equal to the other; 3) B>one neighbor and equal to the other; 4) B>A and B>C; and 5) none of the above, and the categories 1) and 2) are combined in a first combined category for (B≤A and B≤C) and the categories 3) and 4) are combined in a second combined category for (B≥A and B≥C), and the pixel B is modified according to the first combined category or the second combined category.

21. The decoding apparatus of claim 20, wherein if (B≤A and B≤C), then the modification to pixel B as part of the sample adaptive offset is only 1, and if (B≥A and B≥C), then the modification to pixel B as part of the sample adaptive offset is only −1.

22. The decoding apparatus of claim 21, wherein if |A+C−2B|<2, then no modification is made to the pixel B as part of the sample adaptive offset.

* * * * *